Aug. 20, 1957  J. M. TOWLER ET AL  2,803,266
FLUID MOTOR VALVE WITH EXHAUST SURGE PREVENTION CONTROL
Filed Jan. 28, 1952  3 Sheets-Sheet 1

INVENTORS
John Maurice Towler
Frank Hathorn Towler
BY
Carlson, Pitzner, Hubbard & Wolfe
ATTORNEYS INVENTORS
John Maurice Towler
Frank Hathorn Towler
BY
ATTORNEYS Aug. 20, 1957  J. M. TOWLER ET AL  2,803,266
FLUID MOTOR VALVE WITH EXHAUST SURGE PREVENTION CONTROL
Filed Jan. 28, 1952  3 Sheets-Sheet 3

INVENTORS
John Maurice Towler
Frank Hathorn Towler
BY
Carlson, Pitjen, Habbard & Wolfe
ATTORNEYS 2,803,266
Patented Aug. 20, 1957

2,803,266

FLUID MOTOR VALVE WITH EXHAUST SURGE PREVENTION CONTROL

John Maurice Towler, Rodley, and Frank Hathorn Towler, Dob Park, near Otley, England; Frank Hathorn Towler, administrator of said John Maurice Towler, deceased; assignors to Electraulic Presses Limited, Rodley, England, a limited liability company of Great Britain Application January 28, 1952, Serial No. 268,476

Claims priority, application Great Britain February 6, 1951

7 Claims. (Cl. 137—622)

The invention relates to hydraulic control valves and more particularly to an improved valve for controlling the venting to an exhaust line of liquid under relatively high pressure or subject to any other condition wherein considerable energy is stored in the liquid.

One object of the invention is to provide an improved valve of the above general character operative automatically to prevent violent pressure surges in the exhaust line when the valve is opened to vent liquid under pressure to the line.

Another object is to provide a valve of the above type with automatically operating means for restraining it from moving to fully opened position until the pressure in the exhaust line has fallen to a safe level.

A more specific object is to provide a valve embodying means operated solely in response to the pressure in the exhaust line for locking liquid behind the movable valve member to prevent its further movement toward open position whereby violent pressure surges in the exhaust line are avoided.

Other objects and advantages of the invention will become apparent from the following detailed description of the preferred embodiments illustrated in the accompanying drawings in which.

While we have shown and will describe herein various preferred embodiments of our invention, it is to be understood that we do not thereby intend to limit the invention to the particular forms shown but, on the contrary, intend to cover all modifications, adaptations and variations falling within the spirit and scope of the invention as expressed in the appended claims.

Figure 1:
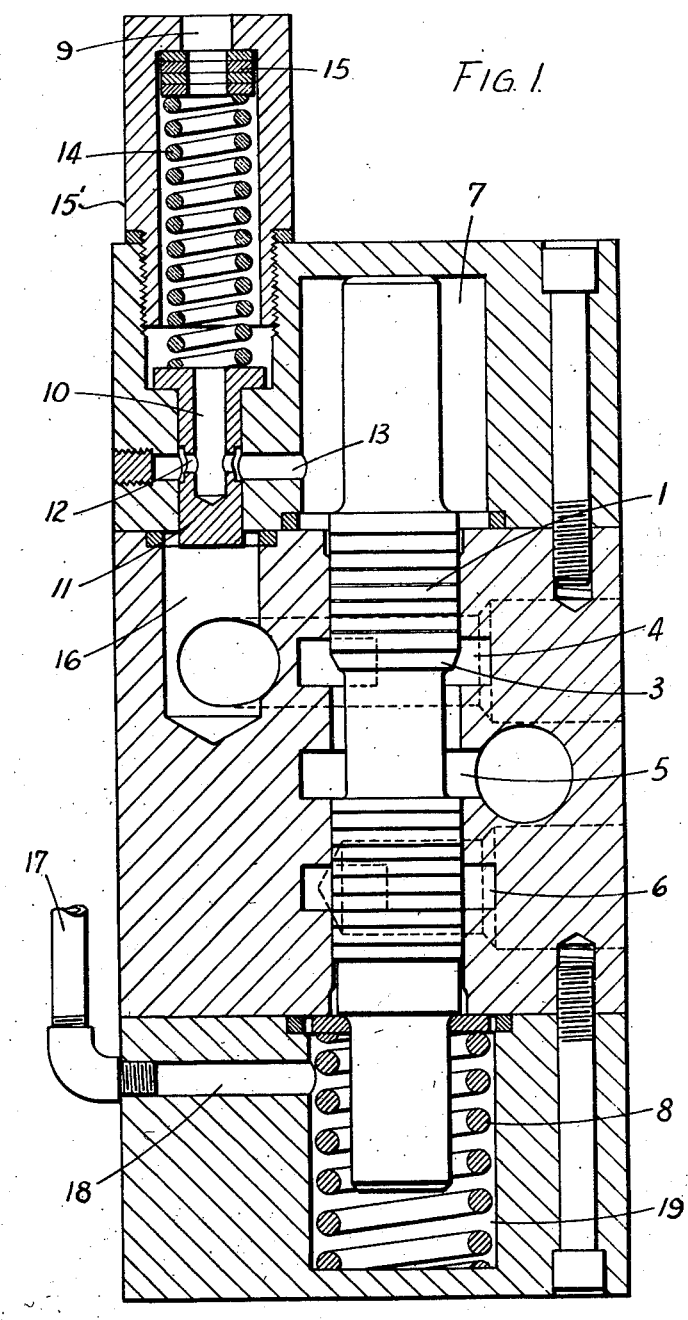
Figure 1 is a view in sectional elevation illustrating a single acting control valve embodying the features of the invention, the valve being arranged for pressure fluid actuation.

Referring to Figure 1 of the drawings, the valve therein illustrated comprises a valve body having a bore for the accommodation of an axially movable member or spindle 1. Opening into the bore at points spaced apart axially thereof are an exhaust port 4, a pressure port 5 and a supply port 6. When installed in a machine, the port 5 is connected to a pressure fluid operated actuator such as a hydraulic cylinder (not shown) and the supply port 6 is connected to the source of primary pressure. The port 4 is connected with an exhaust line or drain.

The valve spindle 1 is suitably shaped for controlling communication between the ports, 4, 5 and 6 in accordance with its position in the bore. In the form shown in Figure 1 of the drawings, the spindle 1 has one end portion projecting into a chamber 7 formed in the valve body and the opposite end projecting into a chamber 19. In the case of a single acting valve such as that shown, the chamber 19 houses a spring 8 which yieldably urges the spindle into the chamber 7 or toward the exhaust position in which it is shown in Figure 1. In such exhaust position, the port 5 is in free communication with the exhaust port 4.

In the exemplary valve, the chamber 7 serves as an actuating cylinder and, if pilot pressure fluid from a pilot line is admitted thereto, it will force the valve spindle 1 downwardly in opposition to the spring 8. When the valve spindle is shifted to the admission position, the port 6 is placed in free communication with the port 5 and the exhaust port 4 is closed. If fluid is now permitted to exhaust from the actuating cylinder, the spring 8 will force the valve spindle 1 upwardly thereby closing the supply port 6 and establishing communication between the pressure port 5 and exhaust port 4. It will be observed that the valve spindle has a tapered shoulder 3 which provides a restricted passage as the valve spindle uncovers the edge of the port 4 to connect the port 5 to exhaust.

Pilot pressure fluid is admitted to and exhausted from the actuating cylinder 7 by way of a pilot passage 9 in which a pilot valve of any preferred character may be interposed. In accordance with the invention, the pilot passage 9 communicates with the actuating cylinder 7 through a central passage 10 in a spring loaded plunger 11 which has radial ports 12 adapted to register with a transverse passage 13 in the valve body when the plunger is in the normal rest position in which it is shown in Figure 1. The plunger 11 is loaded by a spring 14 interposed between its outer end and a stack of spacing elements in the form of washers 15 seating against the adjacent end of a housing 15' enclosing the spring. The force of the spring may be adjusted by adding or removing washers 15.

The spring loaded plunger 11 preferably has a slidable lap fit in a bore formed in the valve body and its inner end projects into a chamber 16 in the valve body which is in communication with an exhaust line and into which the exhaust port 4 opens. Thus the plunger 11 has its lower end subjected to the pressure in the exhaust line. When the pilot line 9 is open to an exhaust position, the valve spindle is moved inwardly by the spring 8 thus forcing fluid from the cylinder 7 through the passage 13, ports 12 and passage 10. Upon predetermined movement of the valve spindle communication is established between the valve ports 5 and 4 for discharge of liquid under pressure into chamber 16 and thence to the exhaust line. In practice, an exhaust line is provided which is sufficiently large to handle the normal exhaust flow without developing an appreciable rise in pressure. However, the pressure in the exhaust line may rise substantially when the fluid being vented is under relatively high pressure or has a substantial amount of stored energy, and if the rise exceeds a predetermined value the plunger 11 is forced outwardly in opposition to the spring 14. This outward movement will carry the ports 12 out of register with the passage 13 thereby interrupting the flow of fluid from the actuating cylinder 7 to the pilot exhaust passage. Fluid is thus locked in the actuating cylinder to prevent further movement of the valve spindle 1.

The operation of the valve above described is as follows: Assume that the valve spindle 1 is in the admission position which, as previously described, is the extreme downward position as viewed in Figure 1. The valve may be maintained in that position by simply keeping the pilot line 9 closed. When the pilot line is opened to permit pressure fluid to flow from the actuating cylinder 7 to the pilot exhaust passage, the spring 8 will force the valve spindle 1 upwardly towards the exhaust position. As the valve spindle moves upwardly the edge of the exhaust port 4 will be uncovered by the tapered shoulder 3 of the valve spindle and there will be a sudden surge of pressure fluid in chamber 16 due to the sudden release of compressed liquid from the hydraulic actuator connected to the port 5. If the pressure of the liquid exhausted to the chamber 16 exceeds the predetermined value for which the loading spring 14 is set, the plunger 11 is moved outwardly to close ports 12 with the result that the fluid will be locked in the actuating cylinder 7. Consequently, the further upward movement of the valve spindle 1 will be interrupted. When the pressure in the chamber 16 falls below the predetermined value the plunger 11 is moved inwardly by its spring 14 to reestablish communication between the actuating cylinder 7 and the pilot line 9 to the pilot line exhaust passage. When this occurs, the valve spindle 1 will resume its movement under the action of the spring 8 until its reaches the fully open exhaust position in which it is shown in Figure 1 of the drawings.

It will be evident from the foregoing that the movement of the valve plunger 1 as it uncovers the edge of the exhaust port 4 is restrained by the spring loaded plunger 11 which automatically restricts or interrupts the escape of fluid from the actuating cylinder 7 if the pressure in the chamber 16, which opens into the exhaust line, rises above a predetermined value. On the other hand, if the pilot valve is set to admit pressure fluid to the pilot line 9 the valve spindle 1 will be moved immediately into its downward position to admit such pressure fluid to the actuating cylinder 7 and thus shift the valve spindle 1 out of exhaust position.

Figure 2:
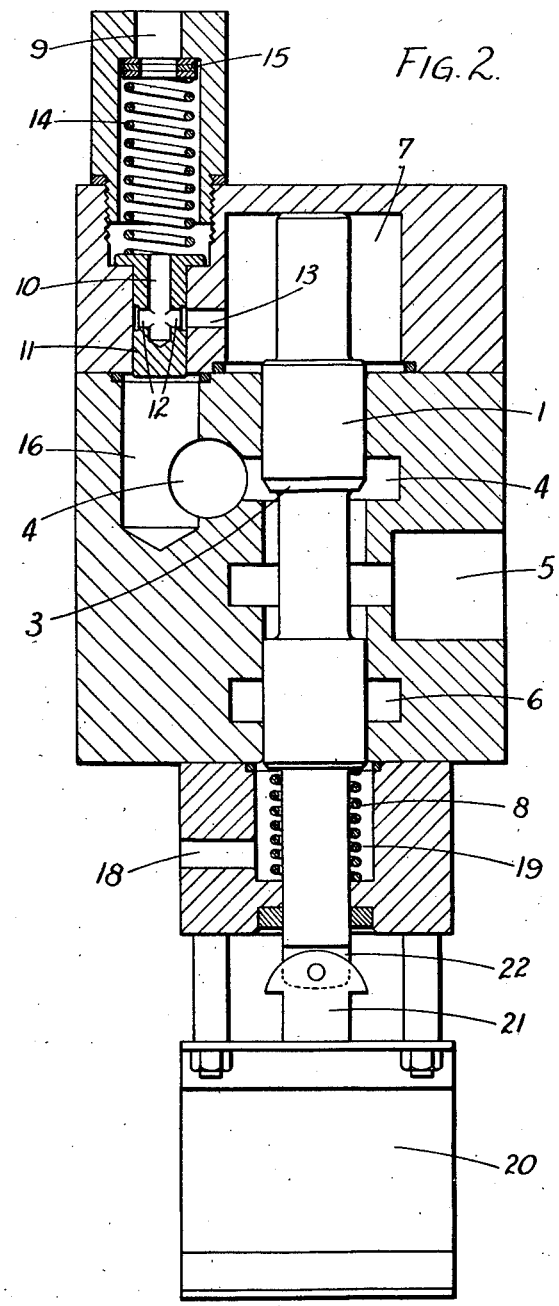
Fig. 2 is a view of a single acting control valve similar to that shown in Figure 1 but arranged for actuation by a solenoid.

In the embodiment of the invention illustrated in Fig. 2 the valve spindle 1 is moved to the admission position against the action of the spring 8 by an electrically operated actuator or solenoid 20. The solenoid is mounted on the valve casing at the end remote from the chamber 7 and has its armature 21 connected with a suitable extension 22 on the end of the valve spindle. The arrangement is such that when the solenoid is energized the valve spindle 1 is pulled downwardly into admission position to establish communication between the ports 6 and 5. The current for energizing the solenoid is controlled by a suitable pilot switch (not shown) which takes the place of the control valve in the pilot line above described.

It will be observed, however, that the upper end of the valve spindle 1 projects into the cylinder 7 as in the previous case and that fluid is admitted to and exhausted from this cylinder under control of the valve 11 as in the previously described embodiment. In this instance, however, the passage 9 is simply connected with a tank or reservoir for storing fluid and the cylinder 7 functions as a dashpot. In other words, fluid is drawn into or forced out of the cylinder 7 in the movements of the valve spindle by the solenoid 20 or spring 8. As long as the valve plunger 11 is in the normal open position, such flow into and out of the dashpot may take place freely. However, when the plunger 11 is shifted to closed position by excessive pressure in the exhaust chamber 16, the fluid is locked in cylinder 7 to prevent further movement of the valve spindle and thus effectively prevent a violent surge of pressure in the exhaust.

Figure 3:
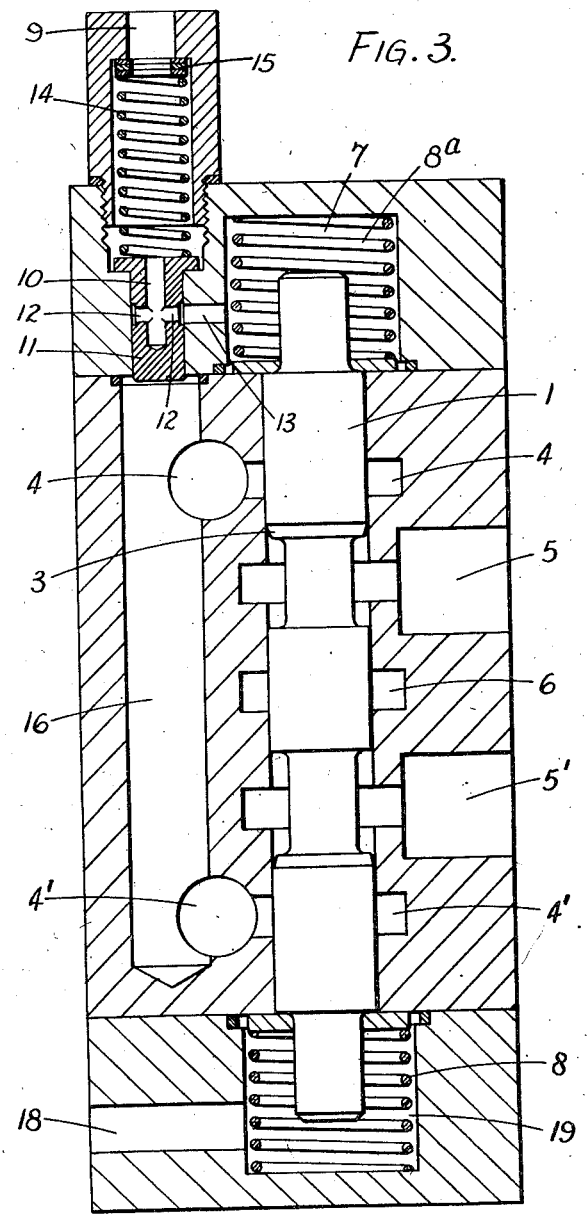
Fig. 3 is a sectional elevation illustrating a double acting form of the control valve.

The invention may be applied to a double acting control valve in the manner illustrated in Fig. 3 of the drawings. In such valves the control plunger is moved in both directions by suitable actuators which may be either electrically operated or pressure fluid operated as in the exemplary valve illustrated. Operation of the exemplary valve in one direction is effected by admitting pressure fluid to the cylinder 7 as in the case of the single acting valve previously described, while operation in the other direction is effected by admission of pressure fluid through the passage 18 into the chamber 19 which, in this instance, constitutes a second actuating cylinder. Spring 8 may be dispensed with if desired or it may be retained and a second spring 8a installed in the chamber 7 to act on the opposite end of the valve spindle. The two springs, of course, are arranged so as to exert substantially equal forces on opposite ends of the valve spindle and thus centralize it in neutral position when both cylinders 7 and 19 are open to exhaust.

Ordinarily double acting valves of the type under consideration will have a second pressure port 5' and a second exhaust port 4'. Chamber 16, of course, is extended to connect with both exhaust ports. It will be appreciated, of course, that instead of merely providing the passage 18 a control valve similar to the valve 11 may be provided in the pilot line extending to the chamber 19 if desired in which case the operation will be precisely like that heretofore described. However, the danger of pressure surge will usually occur only when the valve spindle is moved in one direction. Accordingly, in the preferred arrangement shown, only one spring loaded plunger 11 is required to restrain the valve spindle when moving in that direction. As in the embodiments previously described, the plunger 11 interrupts the exhaust from the cylinder 7 when the pressure in the exhaust chamber 16 reaches or exceeds a predetermined value. The valve spindle 1 is thus locked against further movement and exhaust of fluid from the port 4 or port 4' is restricted until the pressure in the exhaust falls to a safe level.

We claim:

1. A valve comprising, in combination, a valve body having a first port adapted to be connected to a source of liquid under pressure and a second port adapted to be connected to an exhaust line, a valve spindle shiftable axially within said body to control communication between said ports, said valve body having a chamber at one end in which said valve spindle presents an effective fluid pressure area and a pilot passage for admitting pilot pressure fluid to an exhaust of fluid from the chamber, said valve spindle moving in a direction to interrupt communication between said ports when fluid is admitted to said chamber and in the opposite direction to establish communication between the ports when fluid is permitted to flow from the chamber, a valve plunger controlling fluid flow through said pilot passage having an effective fluid pressure area at one end subject to the pressure of liquid in the exhaust line and an effective fluid pressure area at the other end subject to the pressure of the pilot fluid and urged thereby to an advanced position to permit unrestricted flow of pilot pressure fluid to said chamber, and spring means yieldably retaining said plunger in said advanced position upon interruption of the pilot pressure fluid supply to allow fluid flow from said chamber until the pressure in the exhaust line exceeds a predetermined value.

2. A valve comprising, in combination, a valve body having a bore opening at opposite ends into a pair of chambers, said body having a pair of ports opening into said bore and adapted to be connected respectively to a source of fluid under pressure and to an exhaust line, a valve spindle slidable axially of said bore into and out of the respective chambers and presenting effective pressure areas in each chamber, said spindle being operative on movement into one of said chambers to establish communication between said ports and operative on movement out of said one chamber to interrupt communication between said ports, passages in said valve body for the flow of fluid from and to said one chamber to control the in and out movements of said valve spindle, and valve means including a movable member urged by the pressure of the fluid in said passage toward a position affording uninterrupted flow of fluid into said one chamber, said member being urged away from such position by the pressure in the exhaust line to close said passages against fluid flow from said one chamber and thereby restrain said valve spindle against further movement when the pressure in the exhaust line exceeds a predetermined value.

3. A valve as defined in claim 2 characterized by having means associated with the end of the valve spindle remote from said one chamber for shifting the spindle wherein said one chamber operates as a dashpot in cooperation with said valve means to regulate the movement of the spindle.

4. A valve as defined in claim 2 having a spring acting on the end of the valve spindle remote from said one chamber operative to shift the spindle toward the exhaust position.

5. A valve as defined in claim 2 having springs acting on opposite ends of the valve spindle tending to centralize the spindle in a neutral position.

6. A valve as defined in claim 2 having a solenoid connected with the valve spindle so as to move the same to admission position when energized, and a spring operative to move the spindle to exhaust position when the solenoid is deenergized.

7. A valve as defined in claim 2 having pressure fluid actuated means acting on each end of the valve spindle and operable alternatively to shift the spindle in opposite directions.

References Cited in the file of this patent

UNITED STATES PATENTS

| | | |
|---|---|---|
| 2,157,707 | Keel | May 9, 1939 |
| 2,253,617 | Griffith | Aug. 26, 1941 |
| 2,411,716 | Ernst | Nov. 26, 1946 |
| 2,545,246 | Tucker | Mar. 13, 1951 |